United States Patent
Ding et al.

(10) Patent No.: US 10,908,998 B2
(45) Date of Patent: Feb. 2, 2021

(54) MANAGING FUNCTION LEVEL RESET IN AN IO VIRTUALIZATION-ENABLED STORAGE DEVICE

(71) Applicant: Toshiba Memory Corporation, Tokyo (JP)

(72) Inventors: Zhimin Ding, Sunnyvale, CA (US); Sancar K. Olcay, Sunnyvale, CA (US)

(73) Assignee: Toshiba Memory Corporation, Tokyo (JP)

( * ) Notice: Subject to any disclaimer, the term of this patent is extended or adjusted under 35 U.S.C. 154(b) by 51 days.

(21) Appl. No.: 15/671,436

(22) Filed: Aug. 8, 2017

(65) Prior Publication Data

US 2019/0050295 A1 Feb. 14, 2019

(51) Int. Cl.
*G06F 3/06* (2006.01)
*G06F 11/14* (2006.01)
(Continued)

(52) U.S. Cl.
CPC ........ *G06F 11/1441* (2013.01); *G06F 3/0604* (2013.01); *G06F 3/0658* (2013.01);
(Continued)

(58) Field of Classification Search
CPC ............. G06F 11/1141; G06F 9/45558; G06F 11/0745
See application file for complete search history.

(56) References Cited

U.S. PATENT DOCUMENTS 8,041,995 B2  10/2011  Abe
8,176,304 B2   5/2012  Puri et al.
(Continued)

FOREIGN PATENT DOCUMENTS

TW    2012-35947 A    9/2012
TW    2012-37619 A    9/2012
(Continued)

OTHER PUBLICATIONS

Peripheral Component Interconnect Special Interest Group, Peripheral Component Interconnect Special Interest Group, 3855 SW 153rd Drive Beaverton, OR 97003, US, Jan. 20, 2010, "Single Root I/O Virtualization and Sharing Specification" Revision 1.1, pp. 1-90.
(Continued)

*Primary Examiner* — William B Partridge
*Assistant Examiner* — Eric T Loonan
(74) *Attorney, Agent, or Firm* — White & Case LLP

(57) ABSTRACT

A data storage device comprises a non-volatile semiconductor memory device and a solid-state drive controller communicatively coupled to the non-volatile semiconductor memory device, including a function level reset manager. The function level reset manager can receive a function level reset request from a host system, generate a function level reset bitmap based on the function level reset request, and broadcast the function level reset request to a command processing pipeline. The function level reset bitmap can indicate which functions are in a reset state. Further, the function level reset manager can determine which functions are in the reset state and instruct the command processing pipeline to cancel commands associated with the functions in the reset state.

22 Claims, 5 Drawing Sheets

(51) Int. Cl.
  *G06F 13/42* (2006.01)
  *G06F 9/455* (2018.01)
  *G06F 11/07* (2006.01)

(52) U.S. Cl.
  CPC .......... *G06F 3/0659* (2013.01); *G06F 3/0664* (2013.01); *G06F 3/0679* (2013.01); *G06F 9/45558* (2013.01); *G06F 11/0745* (2013.01); *G06F 13/4221* (2013.01); *G06F 2009/45579* (2013.01); *G06F 2009/45583* (2013.01); *G06F 2213/0058* (2013.01)

(56) References Cited

U.S. PATENT DOCUMENTS

| | | | |
|---|---|---|---|
| 8,271,716 | B2 | 9/2012 | Srinivasan |
| 8,527,745 | B2 | 9/2013 | Watkins et al. |
| 8,677,030 | B2 | 3/2014 | Srinivasan |
| 9,047,208 | B1 | 6/2015 | Moore et al. |
| 9,201,682 | B2 | 12/2015 | Cheng et al. |
| 2007/0240018 | A1* | 10/2007 | Nalawadi ............ G06F 11/1438 714/23 |
| 2011/0134915 | A1* | 6/2011 | Srinivasan ............ G06F 13/28 370/389 |
| 2012/0221764 | A1* | 8/2012 | Glass .................... G06F 3/0659 710/314 |
| 2013/0297894 | A1* | 11/2013 | Cohen ................... G06F 3/0679 711/154 |
| 2014/0181327 | A1 | 6/2014 | Cohen |
| 2015/0143175 | A1 | 5/2015 | Kidamura |
| 2016/0098365 | A1 | 4/2016 | Bshara et al. |
| 2018/0129270 | A1* | 5/2018 | Garg ....................... G06F 1/325 |

FOREIGN PATENT DOCUMENTS

| | | |
|---|---|---|
| TW | 2015-43230 A | 11/2015 |
| TW | 2016-02806 A | 1/2016 |

OTHER PUBLICATIONS

Extended European Search Report, dated Nov. 18, 2018, cited in corresponding European Patent Application No. 18187955.2.
Taiwanese Office Action dated Jun. 11, 2019 in corresponding Taiwanese Application No. 107127474, along with English translation.

\* cited by examiner

MANAGING FUNCTION LEVEL RESET IN AN IO VIRTUALIZATION-ENABLED STORAGE DEVICE

FIELD OF THE INVENTION

The present disclosure relates to data storage devices and methods for managing function level reset requests in an input/output virtualization-enabled storage device.

BACKGROUND

With input/output (IO) virtualization, a high capacity storage device such as a solid-state drive (SSD) can operate efficiently in a highly virtualized environment. Multiple virtual machines (VMs) in the host environment can utilize different physical and virtual functions (VFs) in the SSD and operate in such a way as if each VM has exclusive access to a whole SSD. However, there has been concern about potential security and stability issued with SSDs that support IO virtualization.

Function level reset (FLR) enables a system to reset functions that cease to operate normally or are unstable. Virtual functions may become unstable if the associated VM is faulty or malicious. FLR requests apply on a per function basis and only affect the targeted function. However, there remains a long felt need to allow the system to quickly and selectively abort and clean up the commands belonging to a function affected by reset while rendering minimum impact, in terms of speed and stability of other functions.

SUMMARY OF INVENTION

The present disclosure relates to a data storage device comprising a non-volatile semiconductor memory device and an SSD controller, communicatively coupled to the non-volatile semiconductor memory device, including an FLR manager. The FLR manager can receive an FLR request from a host system, generate an FLR bitmap based on the FLR request, broadcast the FLR request to a command processing pipeline, and instructs the command processing pipeline to cancel commands associated with the functions in the reset state. The FLR bitmap can indicate which functions of a plurality of functions are in a reset state.

According to one implementation, the FLR manager may determine which functions of the plurality of functions are in the reset state. Each of the plurality of functions can be associated with a command of a plurality of commands. In some implementations, the command processing pipeline may cancel commands associated with the functions of the plurality of functions in the reset state.

In other implementations, the command processing pipeline may determine which functions of the plurality of functions are in the reset state based on the FLR bitmap.

In certain implementations, the FLR manager may determine which functions of the plurality of functions are in the reset state based on a command counter communicatively coupled to the FLR manager. The command counter may be configured to store a count of the plurality of commands in the command processing pipeline for each function.

According to some implementations, the FLR manager may process commands associated with the functions of the plurality of functions not in the reset state.

In some implementations, the host system is a virtual machine host comprising a plurality of virtual machines. According to one implementation, the plurality of functions comprises a plurality of physical functions. In other implementations, the plurality of functions comprises a plurality of virtual functions, wherein each of the plurality of virtual functions is associated with at least one physical function.

In certain implementations, the FLR manager is communicatively coupled to the host system through a peripheral component interconnect express (PCIe) interface.

A second aspect of the present disclosure relates to a method of managing an FLR in a data storage device. The method comprises receiving, at an FLR manager, an FLR request from a host system. The FLR manager may be within an SSD controller. The method also comprises generating, at the FLR manager, an FLR bitmap based on the FLR request. The FLR bitmap may indicate which functions of a plurality of functions are in a reset state. Further, the method comprises broadcasting, from the FLR manager, the FLR request to a command processing pipeline. The method also comprises canceling, at the command processing pipeline, commands associated with the functions of the plurality of functions in the reset state.

According to some implementations, the method further comprises determining, at the command processing pipeline, which functions of the plurality of functions are in the reset state. Each of the plurality of functions may be associated with a command of a plurality of commands.

In some implementations, the method further comprises determining, at the command processing pipeline, which functions of the plurality of functions are in the reset state based on the FLR bitmap.

In other implementations, the method further comprises determining, at the command processing pipeline, which functions of the plurality of functions are in the reset state based on a command counter. The command counter may store a count of the plurality of commands in the command processing pipeline.

According to some implementations, the method also comprises processing commands associated with the functions of the plurality of functions not in the reset state.

In certain implementations, the host system is a virtual machine host comprising a plurality of virtual machines. In other implementations, the plurality of functions comprises a plurality of physical functions. According to some implementations, the plurality of functions comprises a plurality of virtual functions, wherein each of the plurality of virtual functions is associated with at least one physical function.

In certain implementations, the FLR manager communicates with the host system through a PCIe interface.

BRIEF DESCRIPTION OF THE DRAWINGS

The foregoing and other objects and advantages will be apparent upon consideration of the following detailed description, taken in conjunction with the accompanying drawings, in which like reference characters refer to like parts throughout, and in which.

DETAILED DESCRIPTION

Figure 1:
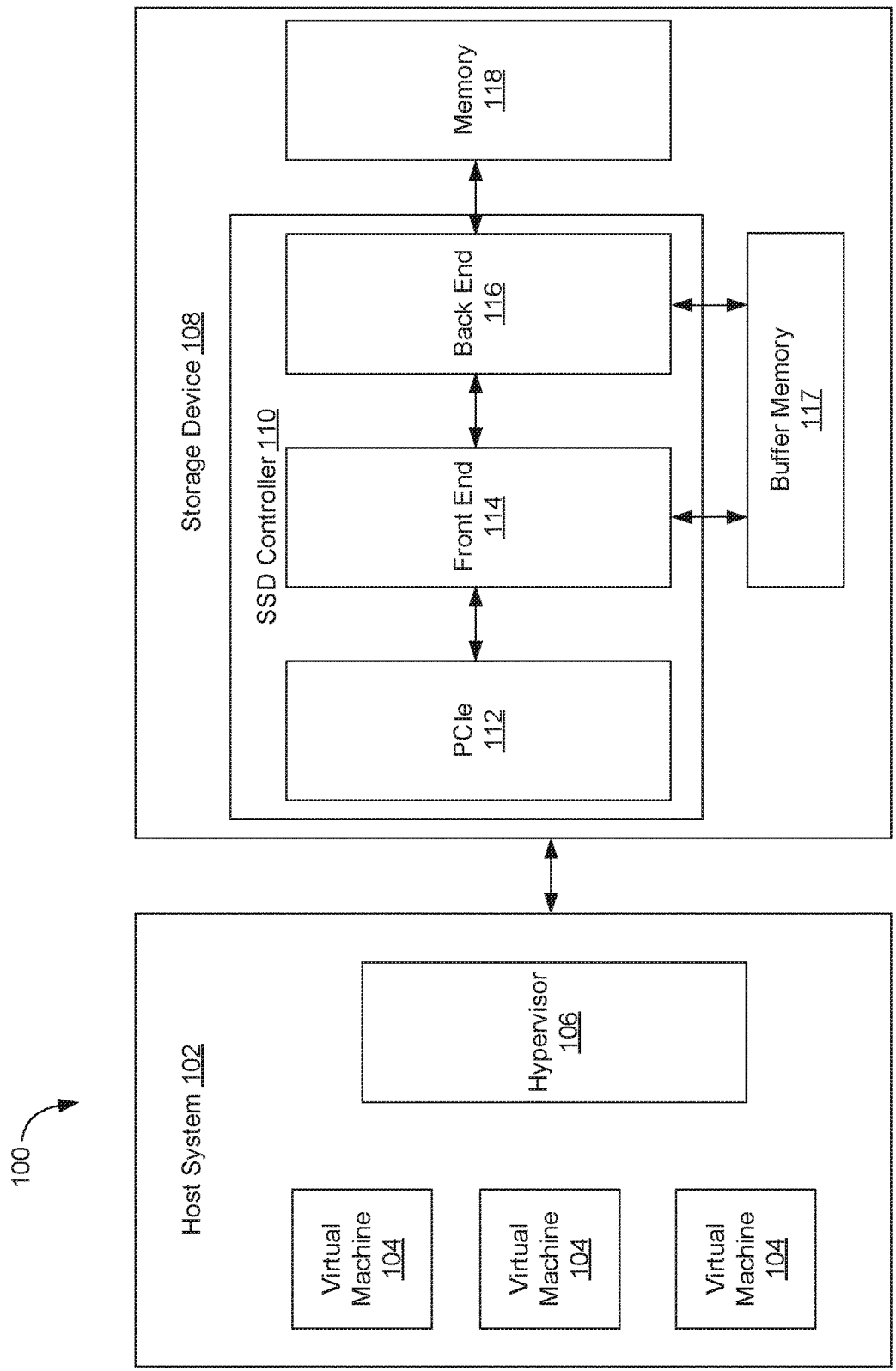
FIG. 1 shows a schematic representation of data storage device, configured according to one or more embodiments of the present disclosure.

FIG. 1 shows a schematic representation of a computing system 100 comprising a host system 102 and storage device 108. The host system 102 is communicatively coupled to the storage device 108. The host system 102 is a computing system that comprises virtual machines 104 and a hypervisor 106. Hypervisor 106 manages multiple independent computer system emulations called virtual machines 104. Virtual machines 104 each specify a different virtual function when issuing commands to SSD controller 110. The storage device 108 is a SSD that comprises an SSD controller 110, buffer memory 117, and memory 118. The SSD controller 110 comprises PCIe interface 112, front end 114, and back end 116. The storage device 108 provides non-volatile storage functionality for use by the host system 102 and includes non-volatile semiconductor storage elements 118, such as NAND-based flash memory, as the storage medium. The buffer memory 117 acts as a high speed intermediate buffer for the transfer between the host system 102 and memory 116. Storage device 108 may also include other elements not shown, such as power supply circuitry, indicator light circuitry, temperature sensors, boot circuitry, clock circuitry, and other circuitry for assisting with various functions.

The SSD controller 110 receives and processes commands from host system 102 in order to perform operations on the memory 118. Commands from host system 102 include requests to read or write to locations within the memory 118 and administrative commands, such as commands for querying the feature set of storage device 108, commands for formatting memory 118, commands for creating and modifying various types of queues, commands for requesting notification of various events, and various other commands. The SSD controller 110 may also include other elements not shown.

The PCIe interface 112 comprises circuitry for communicating with the host system 102 according to the known PCIe standard. In another embodiment, the storage device 108 communicates with the host system 102 using a serial advanced technology attachment (SATA) interface. The PCIe interface 112 allows the storage device 108 to communicate with the host system 102 at faster data transfer speeds and with more bandwidth compared with a SATA interface.

The front end 114 communicates with host system 102 using the PCIe interface 112 to receive, organize, and process commands and data from the host system 102. The front end 114 also transfers data between the host system 102 and storage device 108 using the PCIe interface 112. The back end 116 performs data transfer tasks associated with commands received from the front end 114. The tasks performed by the back end 116 include transferring data between memory 118 and buffer memory 117.

Memory 118 is a non-volatile semiconductor memory that stores data at the request of the host system 102. Memory 118 includes one or more arrays of non-volatile semiconductor-based storage elements, some examples of which include non-volatile NAND flash memory, non-volatile NOR flash memory, non-volatile DRAM based memory, magnetoresistive random-access memory (MRAM), and other types of memory.

Buffer memory 117 is used as a high speed buffer between the host system 102 and memory 118. Buffer memory 117 may include DRAM, but may also include non-volatile semiconductor-based storage elements such as phase change memory (PCM), MRAM, or resistive RAM (ReRAM) in certain applications. Data from the host system 102 is transferred into the buffer memory 117 by front end 114. The data is then transferred from the buffer memory 117 to memory 118 by the back end 116.

Various resources within SSD controller 110 may be shared between multiple virtual functions. SSD controller 110 provides a mechanism whereby host system 102 may configure the manner in which the resources are shared between virtual functions. More specifically, host system 102 may transmit a command to SSD controller 110 to cause the SSD controller 110 to change the amount of resources that are assigned to the different virtual functions.

Within host system 102, hypervisor 106 manages multiple independent computer system emulations called virtual machines 104. Virtual machines 104 each specify a different virtual function when issuing commands to SSD controller 110. Hypervisor 106 manages various functional aspects of virtual machines 104, including IO operations. Hypervisor 106 assigns a different virtual function number to each different virtual machine 104. Hypervisor 106 may assign more than one virtual function number to a particular virtual machine 104 but does not assign the same virtual function number to multiple virtual machines 104. Thus, each virtual function is uniquely assigned to one and only one virtual machine 104. When a virtual machine 104 generates a command to access storage device 108, hypervisor 106 transforms the command to include the virtual function number assigned to the virtual machine 104 and transmits the command and the virtual function number to storage device 108 using PCIe interface 112 for processing.

A virtual machine 104 may query storage device 108 to determine the amount of resources assigned to virtual functions associated with that virtual machine 104. More specifically, at any time, a virtual machine 104 may transmit a query command to storage device 108, requesting information regarding the number of resources that are assigned to virtual functions associated with the virtual machine 104. In response, storage device 108 transmits a message that indicates the number of each particular resource that is assigned to those virtual functions.

Figure 2:
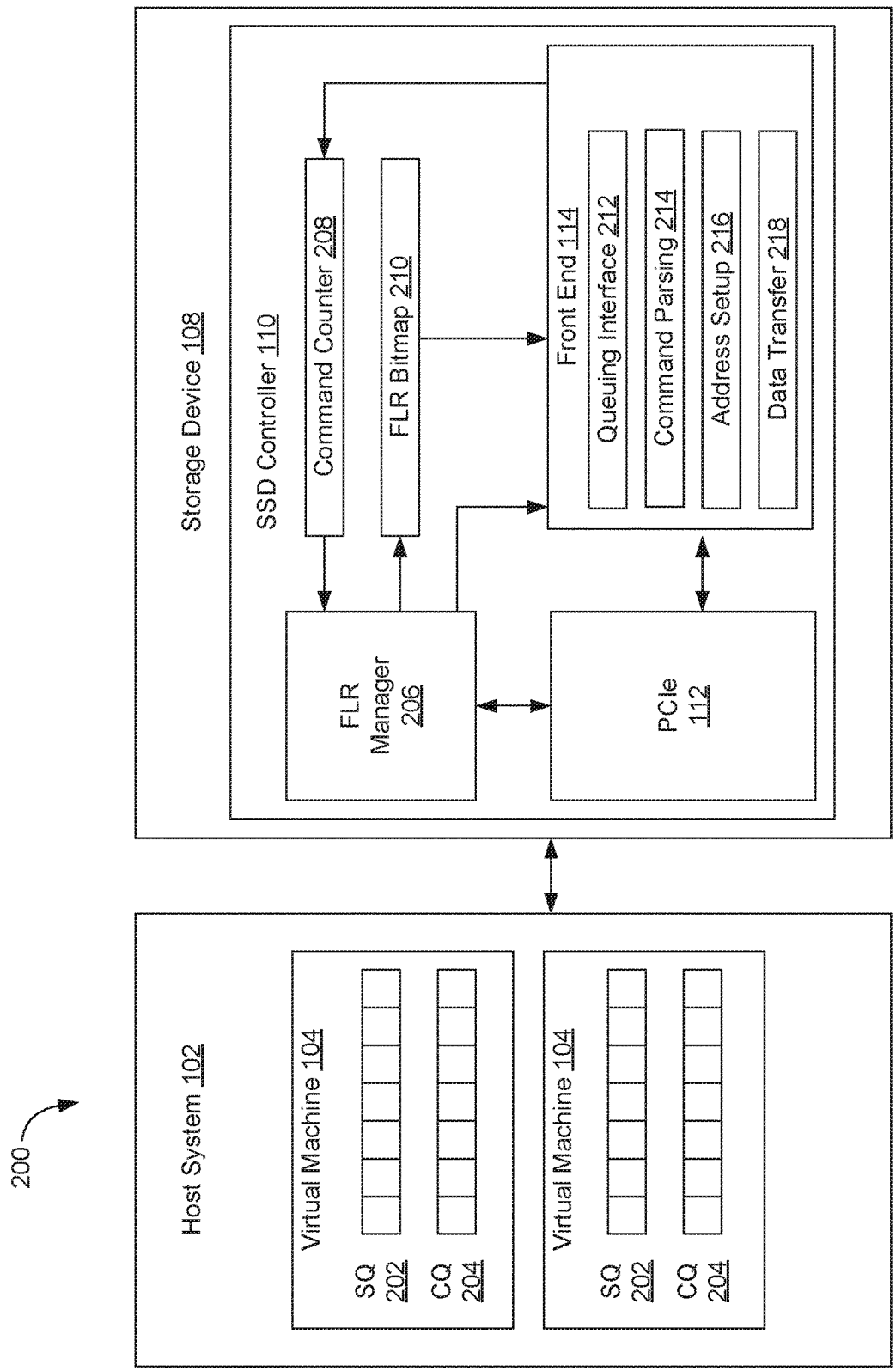
FIG. 2 shows a schematic representation of data storage device, according to an embodiment of the present disclosure.

FIG. 2 shows a schematic representation of a computing system 200 comprising a host client 102 and storage device 108. Computing system 200 is an exemplary example of computing system 100. The host client 102 is a computing system that comprises virtual machines 104. Virtual machine 104 comprises submission queue (SQ) registers 202 and completion queue (CQ) registers 204. The storage device 108 is a SSD that comprises a PCIe interface 112, front end 114, FLR manager 206, command counter 208, and FLR bitmap 210. Other components illustrated by computing system 100 in FIG. 1 have been omitted for ease of explanation.

Front end 114 comprises multiple functional units, including queuing interface 212, command parsing unit 214, address setup unit 216, and data transfer unit 218. Each functional unit may contain processing logic, registers, and local memories, and may detect certain conditions, such as error conditions and exceptions. Queuing interface 212 communicates with the host system 102 about the status of commands stored in submission queues and completion queues stored in memory within host system 102. Submission queues store commands to be fetched by SSD controller 110 and completion queues store information about commands completed by SSD controller 110. Command parsing unit 214 parses or decodes the commands for further processing.

Address setup unit 216 takes the memory addressing information (in the form of Physical Region Page (PRP) or Scatter Gather List (SGL) values decoded by the parsing unit 214 and sets up the memory addresses to perform the DMA transfer of data between the host and storage device. Buffer memory 117 serves as an intermediary between the PCIe interface 112 and back end 116. Data transfer unit 218 performs direct data transfers between host memory (located by the PRP/SGL values) and local buffer memory 117.

Some of the shared resources within storage device 108 are included within the queuing interface unit 212, command parsing unit 214, address setup unit 216, and data transfer unit 218. Additional resources include Submission Queue (SQ) registers 202 and Completion Queue (CQ) registers 204 stored in the host system 102. SQ registers 202 store command identifiers, operations codes, and buffer address parameters to be fetched by storage device 108. CQ registers 204 store command statuses that reference commands that have been completed by storage device 104.

FLR manager 206 acts as a supervisor that ensures system stability while operating with many VFs. One or more VFs may become unstable due to faulty or malicious VMs 104 associated with the VF and may go in and out of reset. The FLR manager 206 would ensure that the poor stability of one VM 104 and/or associated VF will not undermine the stability of other VFs even though they share a pool of resources on the SSD.

The FLR manager 206 detects FLR requests and reports on a per function basis such requests to the front end 114 processing sub units, queuing interface unit 212, command parsing unit 214, address setup unit 216, and data transfer unit 218. Each front end 114 processing sub unit will then quickly and selectively abort or discard commands/workloads of the affected VF while continuing to carry on the processing of commands for the VFs that are not affected. The processing of workloads from different VFs are done in a pipelined fashion using command processing system 300, described below.

The FLR manager 206 receives FLR requests on a per VF basis from the host system 102 via the PCIe interface 112. FLR manager 206 proceeds to request that the command processing system 300 clean up, or drain all of the commands belonging to the affected VF in the pipeline as well as reset operational states of the processing blocks associated with the affected VF. FLR manager 206 also disables the queues associated with the affected function. When the FLR manager 206 finishes this process and determines that all affected commands are drained in the command processing system 300, the FLR manager 206 sends a FLR done indicator to the host system 102 using the PCIe interface 112. The host system 102 can then re-enable the affected VF.

The FLR manager 206 accomplishes this first by detecting the FLR request from the host system 102 via the PCIe interface 112. The FLR manager 206 may prioritize and serialize the FLR request if there are multiple FLR requests. The FLR manager 206 then broadcasts the FLR request through a dedicated bus to all of the front end 114 processing sub units. A dedicated bus to broadcast the FLR request is preferred but there may be other ways to perform the broadcast. The FLR bitmap 210 encodes which functions are in reset. The FLR manager 206, upon receiving the FLR request, updates the FLR bitmap 210 to maintain a record of which functions are in reset. The FLR bitmap 210 is accessible to all of the front end 114 processing sub units. In some embodiments, each front end 114 processing sub units maintains their own FLR bitmap 210. Command counter 208 maintains a record of how many commands are being processed in the pipeline, on a per function basis.

Figure 3:
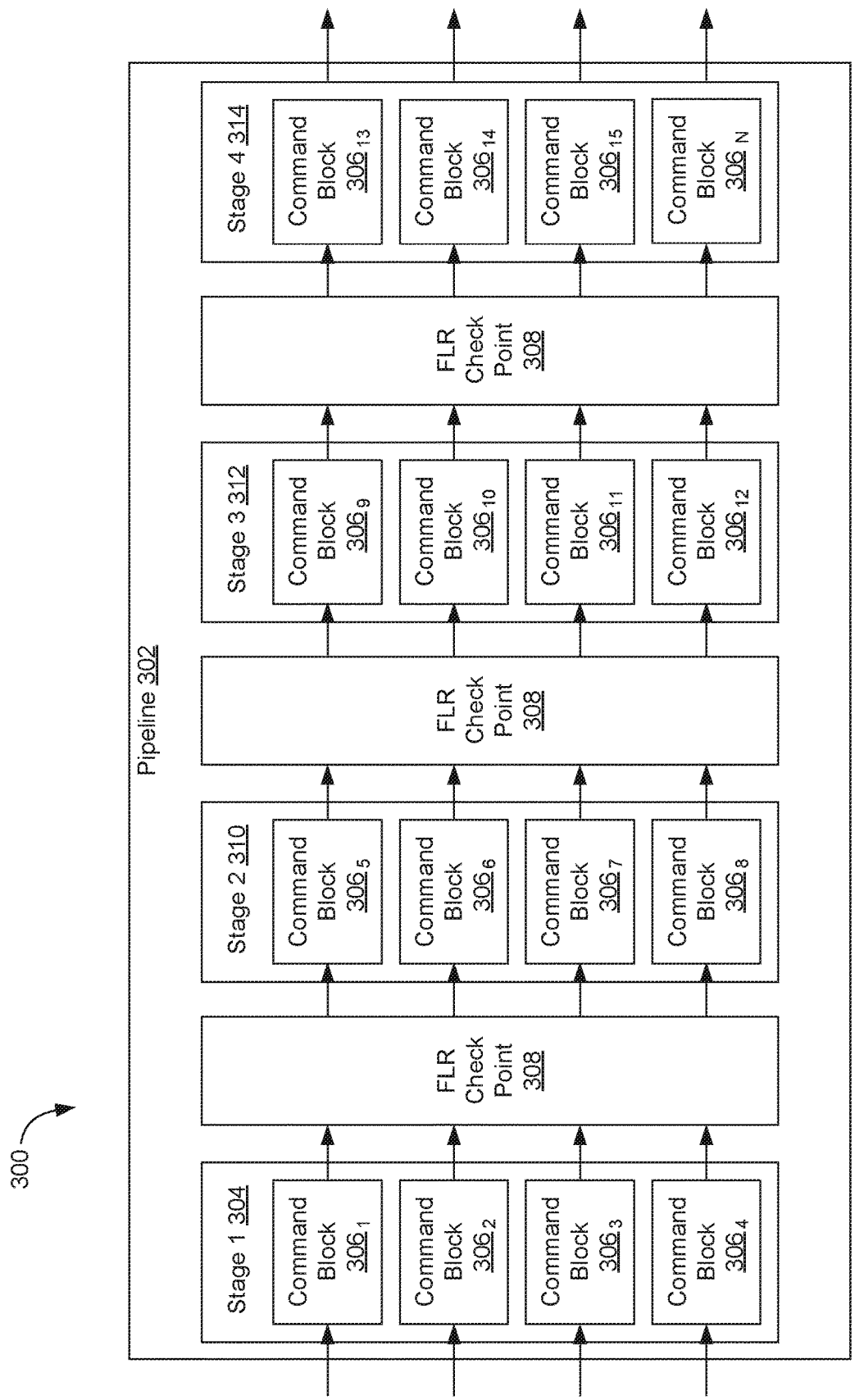
FIG. 3 shows a schematic representation of a command processing pipeline, configured according to one or more embodiments of the present disclosure.

FIG. 3 shows a schematic representation of a command processing system 300 comprising a pipeline 302. Pipeline 302 comprises multiple stages including, stage 1 304, stage 2 310, stage 3 312, and stage 4 314. Each stage 304, 310, 312, and 314 comprises multiple command blocks $306_{1-N}$. Pipeline 302 may also comprise FLR check points 308 between each stage 304, 310, 312, and 314.

The commands that are associated with different VFs are processed in multiple stages in a pipelined fashion using command processing system 300. For example, while a first command associated with a first VF occupies command block 306 of stage 1 304, a second command associated with a second VF occupies command block 306 of stage 2 310.

As a command enters the pipeline 302, the command counter 208, shown in FIG. 2, will be updated (incremented) to reflect the increase in commands in the command processing system 300 for a particular VF. Similarly, when a command exits the pipeline 302, the command counter 208 will be updated (decremented) to reflect the decrease in commands in the command processing system 300 for a particular VF.

There are FLR check points 308 after each pipeline 302 stage. In some embodiments, there may be some pipeline 302 stages that do not have an FLR check point 308 after it. The FLR check points 308 will check the commands as they enter a stage from the previous stage using the FLR bitmap 210. For example, if a command exits stage 1 304 and enters stage 2 310, FLR check point 308 will check the command before it enters stage 2 310. If the command belongs to a function that is in reset, the command will be dropped from the pipeline 302. If the command has been dropped from the pipeline 302, the command that has been dropped is considered to have exited the pipeline 302. This event will cause the command counter 208 to be updated to reflect the decrease in commands in the command processing system 300 for that VF.

The FLR manger 206 monitors the command counter 208 to determine if the FLR request has been completed. When the command counter 208 for a given VF that has received an FLR request reaches zero, the FLR process is considered to be done. If the FLR process is finished, the FLR manager 206 informs the host system 102 of the FLR done status using the PCIe interface 112.

During the processing of an FLR request, by clearing all of the commands that are affected by the FLR in the pipeline 302, the chances of continuing to process a command that is affected by the FLR is reduced. This reduces the chances of the system locking up due to a faulty VF and its associated VM 104. Additionally, the FLR manager 206 will free up resources to process other commands that belong to VFs that are in a healthy state.

Figure 4:
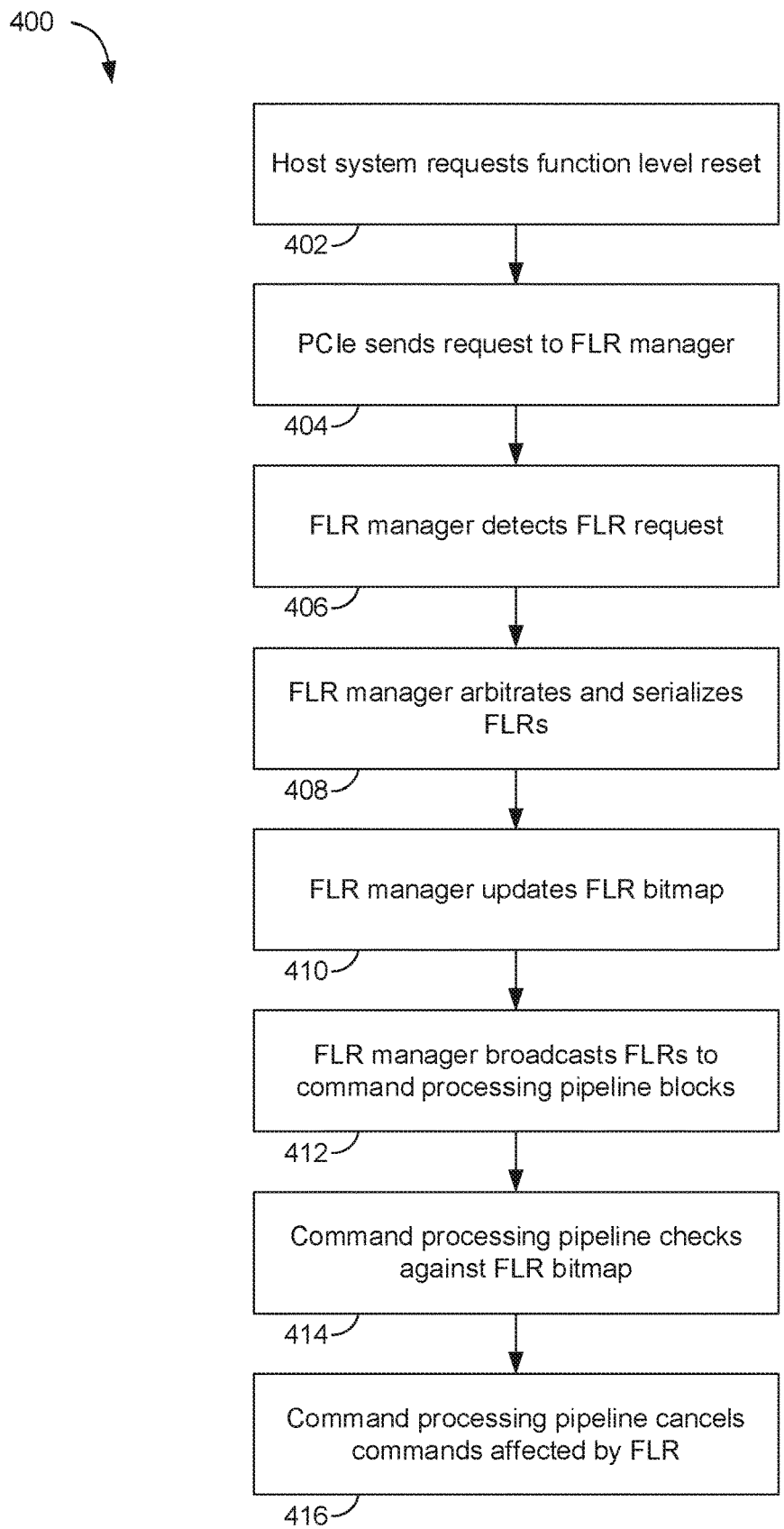
FIG. 4 is a flow diagram of method steps for managing an FLR in a data storage device, according to an embodiment of the present disclosure.

A process 400 of managing an FLR using computing system 200 and command processing system 300 is illustrated in FIG. 4. The process 400 begins by sending an FLR request from the host client 102 to the storage device 108 in step 402. For example, a VF associated with a VM 104 of host system 102 may be unstable. The host system 102 sends a FLR request for the unstable VF to the storage device 108 in order to prevent the processing of commands associated with the faulty VF.

Process 400 continues by sending the FLR request from the PCIe interface 112 to the FLR manager 206 in step 404. For example, the PCIe interface 112 may be communicatively coupled to the FLR manager 206 using a data bus. The FLR request may be sent from the PCIe interface 112 to the FLR manager 206 on a per VF basis.

Process 400 continues by detecting the FLR request at the FLR manager 206 in step 406. For example, the FLR manager 206 detects the FLR request from the host system 102 via the PCIe interface 112. In some embodiments, the FLR manager 206 receives FLR requests on a per VF basis from the host system 102 via the PCIe interface 112.

Process 400 continues by arbitrating and serializing the FLRs at the FLR manager 206 in step 408. For example, the FLR manager 206, upon receiving the FLR request, may determine a priority of FLR requests if more than one FLR request was sent to the FLR manager 206 at the same time. In addition, the FLR manager 206 may generate an FLR bitmap 210 that indicates which VFs are associated with the FLR request. The FLR bitmap 210 encodes which functions are in reset Process 400 continues by updating the FLR bitmap 210 from the FLR manager 206 in step 410. For example, the FLR manager 206, upon receiving the FLR request, updates the FLR bitmap 210 to maintain a record of which functions are in reset. Step 410 is further described in the description of process 500 below.

Process 400 continues by broadcasting the FLRs to the command processing pipeline 302 from FLR manager 206 in step 412. For example, the FLR manager 206 may broadcast the FLR request through a dedicated bus to all of the front end 114 processing sub units, queuing interface unit 212, command parsing unit 214, address setup unit 216, and data transfer unit 218. In some embodiments, the FLR manager 206 reports on a per function basis such FLR requests to the front end 114 processing sub units.

Process 400 continues by comparing the command processing pipeline 302 with the FLR bitmap 210 in step 414. For example, if the command occupying a command block 306 is associated with an affected VF, the FLR manager 206 may compare the location of the command block 306 with the FLR bitmap 210 to determine which command block 306 is currently occupied by the affected command.

Process 400 finishes by canceling the commands affected by the FLR in the command processing pipeline 302 in step 416. For example, each front end 114 processing sub unit can selectively abort or discard commands/workloads of the affected VF while continuing to carry on the processing of commands for the VFs that are not affected. For example, the FLR check points 308 will check the commands as they enter a stage from the previous stage using the FLR bitmap 210. If a command exits stage 1 304 and enters stage 2 310, FLR check point 308 will check the command before it enters stage 2 310. If the command belongs to a function that is in reset, the command will be dropped from the pipeline 302. If the command has been dropped from the pipeline 302, the command that has been dropped is considered to have exited the pipeline 302.

Figure 5:
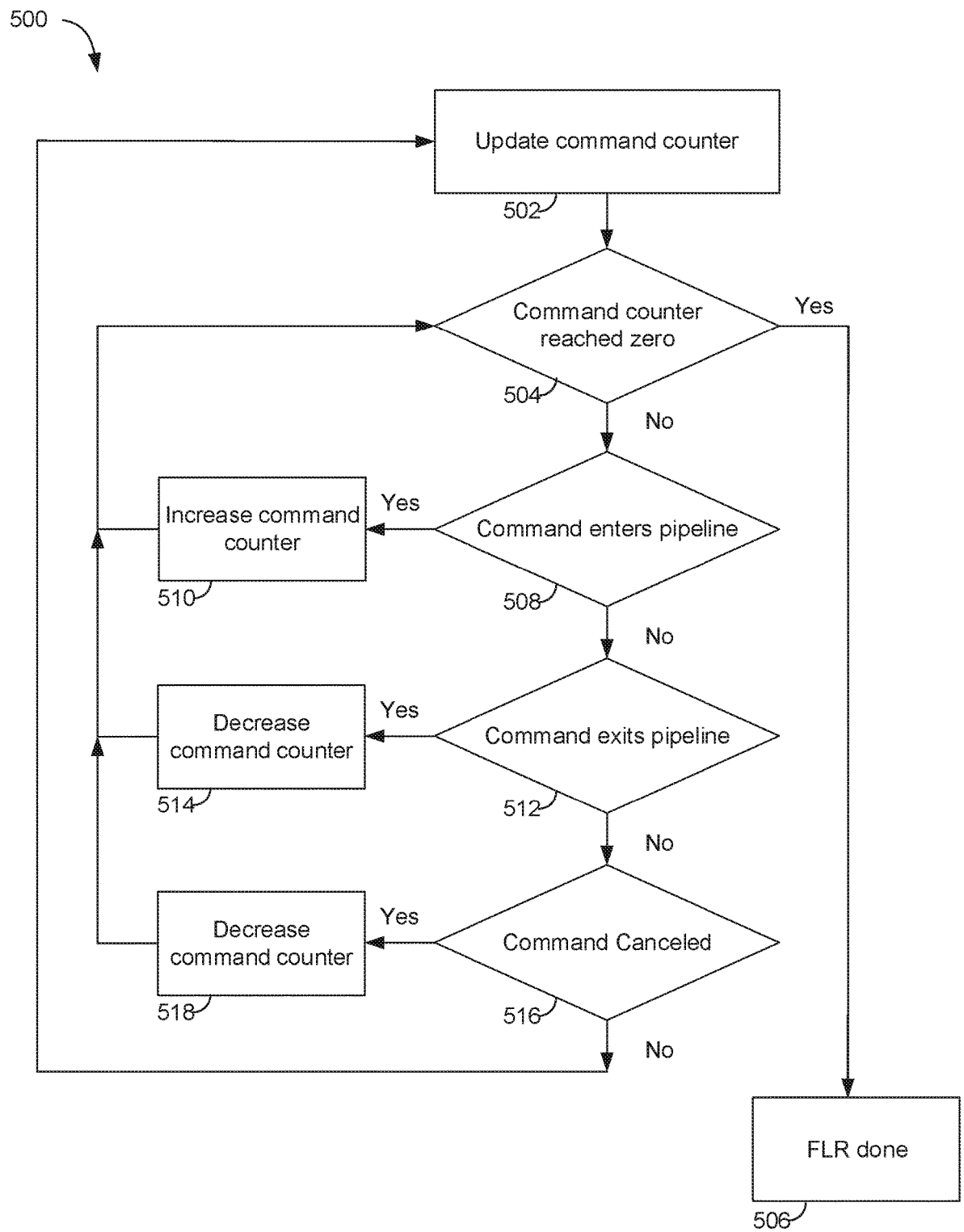
FIG. 5 is a flow diagram of method steps for updating a command counter, configured according to one or more embodiments of the present disclosure.

A process 500 of managing a command counter 208 using computing system 200 and command processing system 300 is illustrated in FIG. 5. The process 500 begins by updating the command counter 208 in step 502. For example, command counter 208 maintains a record of how many commands are being processed in the pipeline, on a per function basis.

Process 500 continues by determining whether the command counter 208 has reached zero in step 504. For example, the FLR manger 206 monitors the command counter 208 to determine if the FLR request has been completed. When the command counter 208 for a given VF that has received an FLR request reaches zero, the FLR process is considered to be done. If the command counter 208 has reached zero, process 500 continues to step 506. Otherwise, process 500 continues to step 508.

Process 500 continues by terminating the FLR request in step 506. For example, when the command counter 208 for a given VF that has received an FLR request reaches zero, the FLR process is considered to be done. If the FLR process is finished, the FLR manager 206 informs the host system 102 of the FLR done status using the PCIe interface 112.

Process 500 continues by determining whether the command associated with the FLR has entered the command processing pipeline 302 in step 508. For example, as a command enters the pipeline 302 and occupies a command block 306, the FLR manager 206 can update the command counter 208 to reflect the increase in commands in the command processing system 300 for a particular VF. If the command associated with the FLR has entered the command processing pipeline 302, process 500 continues to step 510. Otherwise, process 500 continues to step 512.

Process 500 continues by increasing the command counter 208 in step 510. For example, as a command enters the pipeline 302, the command counter 208 will be updated to reflect the increase in commands in the command processing system 300 for a particular VF.

Process 500 continues by determining whether the command associated with the FLR has exited the command processing pipeline 302 in step 512. For example, when a command exits the pipeline 302, the FLR manager 206 can update the command counter 208 to reflect the decrease in commands in the command processing system 300 for a particular VF. If the command associated with the FLR has exited the command processing pipeline 302, process 500 proceeds to step 514. Otherwise, process 500 proceeds to step 516.

Process 500 continues by decreasing the command counter 208 in step 514. For example, when a command exits the pipeline 302, the command counter 208 will be updated to reflect the decrease in commands in the command processing system 300 for a particular VF.

Process 500 continues by determining whether the command associated with the FLR has been canceled in step 516. For example, the FLR check points 308 will check the commands as they enter a stage from the previous stage using the FLR bitmap 210. If a command exits stage 1 304 and enters stage 2 310, FLR check point 308 will check the command before it enters stage 2 310. If the command belongs to a function that is in reset, the command will be dropped from the pipeline 302. If the command has been dropped from the pipeline 302, the command that has been dropped is considered to have exited the pipeline 302. If the command associated with the FLR has been canceled, process 500 proceeds to step 518. Otherwise, process 500 proceeds to step 502.

Process 500 finishes by decreasing the command counter 208 in step 518. For example, if the command has been dropped from the pipeline 302, the command that has been dropped is considered to have exited the pipeline 302. This event will cause the command counter 208 to be updated to reflect the decrease in commands in the command processing system 300 for that VF.

After steps 510, 514, and 518, process 500 proceeds to step 502 in order to update the command counter 208. This is performed in order for the command counter 208 to maintain a record of how many commands are being processed in the pipeline, on a per function basis.

Other objects, advantages and embodiments of the various aspects of the present invention will be apparent to those who are skilled in the field of the invention and are within the scope of the description and the accompanying Figures. For example, but without limitation, structural or functional elements might be rearranged consistent with the present invention. Similarly, principles according to the present invention could be applied to other examples, which, even if not specifically described here in detail, would nevertheless be within the scope of the present invention.

We claim:

1. A data storage device comprising:
   a non-volatile semiconductor memory device; and
   a solid-state drive (SSD) controller, communicatively coupled to the non-volatile semiconductor memory device and configured to store data and retrieve data in the non-volatile semiconductor memory device in response to commands received from a host system external to the data storage device, the SSD controller comprising a function level reset (FLR) manager configured to:
   receive an FLR request from the host system;
   in response to receiving an FLR request, generate an FLR bitmap based on the FLR request, wherein the FLR bitmap indicates which functions of a plurality of functions are in a reset state;
   broadcast the FLR request to a command processing pipeline comprising a plurality of FLR check points;
   at each of the plurality of FLR check points, determine, using the FLR bitmap, if a command associated with a function of the plurality of functions is in a reset state; and
   instruct the command processing pipeline to cancel one or more commands associated with the functions of the plurality of functions in the reset state based on the plurality of functions in the reset state as indicated in the FLR bitmap after the one or more commands have entered the command processing pipeline.

2. The data storage device of claim 1, wherein the SSD controller is further configured to:
   determine, based on the FLR bitmap, which functions of the plurality of functions are in the reset state, wherein each of the plurality of functions is associated with a command of a plurality of commands.

3. The data storage device of claim 2, wherein the SSD controller further comprises a command counter communicatively coupled to the FLR manager, wherein the determining is further based on the command counter.

4. The data storage device of claim 3, wherein the command counter is configured to store a count of the plurality of commands in the command processing pipeline for each function of the plurality of functions.

5. The data storage device of claim 2, wherein the SSD controller is further configured to process commands associated with the functions of the plurality of functions not in the reset state.

6. The data storage device of claim 1, wherein the SSD controller is further configured to:
   instruct the command processing pipeline to cancel the one or more commands at each of the plurality of FLR check points.

7. The data storage device of claim 1, wherein the host system is a virtual machine host comprising a plurality of virtual machines.

8. The data storage device of claim 1, wherein the plurality of functions comprises a plurality of physical functions.

9. The data storage device of claim 8, wherein the plurality of functions further comprises a plurality of virtual functions, wherein each of the plurality of virtual functions is associated with at least one physical function.

10. The data storage device of claim 1, wherein the FLR manager is communicatively coupled to the host system through a serial bus interface.

11. The data storage device of claim 1, wherein the SSD controller is further configured to instruct the command processing pipeline to cancel commands at an FLR check point.

12. A method of managing a function level reset (FLR) in a data storage device, the method comprising:
   receiving, at an FLR manager, an FLR request from a host system external to the data storage device, wherein the FLR manager is within a solid-state drive (SSD) controller configured to store data and retrieve data in the data storage device in response to commands received from the host system;
   in response to receiving the FLR request, generating, at the FLR manager, an FLR bitmap based on the FLR request, wherein the FLR bitmap indicates which functions of a plurality of functions are in a reset state;
   broadcasting, from the FLR manager, the FLR request to a command processing pipeline comprising a plurality of FLR check points;
   determining, at each of the plurality of FLR check points using the FLR bitmap, if a command associated with a function of the plurality of functions is in a reset state; and
   canceling, at the command processing pipeline, one or more commands associated with the functions of the plurality of functions in the reset state based on the plurality of functions in the reset state as indicated in the FLR bitmap after the commands have entered the command processing pipeline.

13. The method of claim 12, further comprising:
   determining, based on the FLR bitmap, at the command processing pipeline, which functions of the plurality of functions are in the reset state, wherein each of the plurality of functions is associated with a command of a plurality of commands.

14. The method of claim 13, wherein the determining is further based on a command counter communicatively coupled to the FLR manager.

15. The method of claim 14, wherein the command counter stores a count of the plurality of commands in the command processing pipeline, for each function of the plurality of functions.

16. The method of claim 13, further comprising processing commands associated with the functions of the plurality of functions not in the reset state.

17. The method of claim 12, further comprising:
   instructing the command processing pipeline to cancel the one or more commands at each of the plurality of FLR check points.

18. The method of claim 12, wherein the host system is a virtual machine host comprising a plurality of virtual machines.

19. The method of claim 12, wherein the plurality of functions comprises a plurality of physical functions.

20. The method of claim 12, wherein the plurality of functions comprises a plurality of virtual functions, wherein each of the plurality of virtual functions is associated with at least one physical function.

21. The method of claim 12, wherein the FLR manager communicates with the host system through a serial bus interface.

22. The method of claim 12, wherein the cancelling of commands occurs at an FLR check point.

* * * * *